(12) United States Patent
Jung et al.

(10) Patent No.: US 11,049,489 B2
(45) Date of Patent: Jun. 29, 2021

(54) SYSTEM AND METHOD FOR CONTROLLING ENGINE TONE BY ARTIFICIAL INTELLIGENCE BASED ON SOUND INDEX OF VEHICLE

(71) Applicants: HYUNDAI MOTOR COMPANY, Seoul (KR); KIA MOTORS CORPORATION, Seoul (KR)

(72) Inventors: In-Soo Jung, Suwon-si (KR); Dong-Chul Lee, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/692,271

(22) Filed: Nov. 22, 2019

(65) Prior Publication Data

US 2020/0193960 A1 Jun. 18, 2020

(30) Foreign Application Priority Data

Dec. 13, 2018 (KR) .................. 10-2018-0160475

(51) Int. Cl.
*G10K 15/02* (2006.01)
*F02D 41/04* (2006.01)
(Continued)

(52) U.S. Cl.
CPC ............. *G10K 15/02* (2013.01); *F02D 41/04* (2013.01); *F02D 41/28* (2013.01);
(Continued)

(58) Field of Classification Search
CPC ............. G10K 15/02; G10K 11/17833; G10K 11/17885; G10K 2210/12;
(Continued)

(56) References Cited

U.S. PATENT DOCUMENTS

2003/0026436 A1* 2/2003 Raptopoulos ........ G10K 11/175
381/71.4
2005/0207585 A1* 9/2005 Christoph ........ G10K 11/17883
381/71.11
(Continued)

FOREIGN PATENT DOCUMENTS

CN 107415870 A 12/2017
DE 102016224984 A1 6/2017
(Continued)

OTHER PUBLICATIONS

Extended European Search Report dated May 14, 2020 issued in European Patent Application No. 19210302.6.

*Primary Examiner* — Lun-See Lao
(74) *Attorney, Agent, or Firm* — Morgan, Lewis & Bockius LLP

(57) ABSTRACT

A system for controlling an engine tone by an artificial intelligence based on a sound quality index of a vehicle may include a sound output device for generating a reinforcing sound to reinforce an engine sound of the vehicle; an engine characteristic measurement sensor for measuring sound source characteristics of the engine sound; an interior noise measurement sensor for detecting interior noise of the vehicle; a signal processing controller that receives signals from the engine characteristic measurement sensor in real time and controls the sound output device such that the engine sound reaches a target tone; and a tone control operation unit connected to the signal processing controller to optimize the sound quality index such that the engine sound reaches the target tone through the artificial intelligence.

19 Claims, 13 Drawing Sheets

(51) Int. Cl.
 *F02D 41/28* (2006.01)
 *G05B 13/02* (2006.01)
 *G10L 25/51* (2013.01)
 *H04R 1/02* (2006.01)
 *H04R 3/04* (2006.01)

(52) U.S. Cl.
 CPC .......... *G05B 13/0265* (2013.01); *G10L 25/51* (2013.01); *H04R 1/025* (2013.01); *H04R 3/04* (2013.01); *F02D 2041/285* (2013.01); *H04R 2499/13* (2013.01)

(58) Field of Classification Search
 CPC ..... G10K 2210/128; G10K 2210/3038; G10K 11/178; G10K 15/04; G10K 2210/1282; G10K 2210/51; G10L 25/51; H04R 1/025; H04R 2499/13; H04R 3/04
 USPC .......................................... 381/86, 71.1–71.6
 See application file for complete search history.

(56) References Cited

U.S. PATENT DOCUMENTS

| | | | | |
|---|---|---|---|---|
| 2012/0257763 | A1* | 10/2012 | Bowden | G10K 11/17823 381/71.4 |
| 2015/0264500 | A1* | 9/2015 | Aoyagi | G10K 15/00 381/56 |
| 2016/0205472 | A1* | 7/2016 | Violi | B60Q 5/00 381/86 |
| 2017/0125038 | A1* | 5/2017 | Hassani | G10L 15/063 |
| 2017/0330550 | A1* | 11/2017 | Lee | G10K 15/02 |
| 2019/0111839 | A1* | 4/2019 | Lee | B60Q 5/005 |

FOREIGN PATENT DOCUMENTS

| | | |
|---|---|---|
| EP | 1577879 A1 | 9/2005 |
| KR | 10-2017-0128939 A | 11/2017 |

* cited by examiner

SYSTEM AND METHOD FOR CONTROLLING ENGINE TONE BY ARTIFICIAL INTELLIGENCE BASED ON SOUND INDEX OF VEHICLE

CROSS-REFERENCE TO RELATED APPLICATIONS

The present application claims the benefit of priority to Korean Patent Application No. 10-2018-0160475, filed on Dec. 13, 2018 in the Korean Intellectual Property Office, the entire disclosure of which is incorporated herein by reference.

TECHNICAL FIELD

Exemplary embodiments of the present disclosure relate to a system and a method for controlling an engine tone by an artificial intelligence based on a sound index of a vehicle.

BACKGROUND

Today's automobiles are becoming an enjoyable object beyond a mere transport means. Driving performance would be one of the pleasures that automobiles give drivers. In recent years, automobile consumers are trending toward demanding both sporty driving and comfortable driving. Currently, the automobile industry is trying to develop a vehicle that can change a driving mode in order to satisfy such troubles. The driving mode refers to a function to adjust ride comfort and change driving performance by controlling a suspension or an engine.

However, there is a limitation in enhancing the driving performance in that manufacturing cost is excessively required to resolve troubles relating to the enhancement of the driving performance only through physical and mechanical approaches. Of course, this may not matter to an expensive sports car. However, most common vehicle manufacturers have no choice but to deliberate how to maximize the effect of the driving performance while maintaining reasonable manufacturing cost.

Drivers are very sensitive to the sense of hearing as well as the sense of sight. Particularly, a dynamic engine sound acts as a crucial factor that multiplies driving pleasure. Some automakers, therefore, have also worked with an orchestra to create an attractive engine sound while adopting high displacement engines. However, such a technology development is limited to a specific high displacement engine and has a limitation in that the manufacturing cost is high.

To this end, the latest technology developed to avoid this is a sound generator. The sound generator is a device for artificially generating a sound similar to, e.g., an engine sound through vehicle-mounted speakers. However, conventional sound generators merely plays an engine tone stored therein, or merely works in conjunction with an acceleration pedal to artificially amplify output sound pressure in proportion to engine speed. Therefore, it was natural that drivers could very easily aware that the sound is nothing but an artificial sound coming from speakers, not a natural engine tone. As a result, this caused a problem that driving pleasure is reduced. On the other hand, it could not be bound to dynamically evolve the engine sound recklessly for the sake of driving pleasure. The reason is that drivers are emotional animals and thus sometimes feel the dynamic sound as loud noise.

Therefore, if necessary, it is also necessary to reduce the engine sound and other noise to be felt by drivers to create a quieter interior atmosphere.

SUMMARY

An object of the present disclosure is to provide to a system and a method for controlling an engine tone by an artificial intelligence based on a sound index of a vehicle whereby a sound quality index is optimized to reach a target tone through the artificial intelligence.

Other objects and advantages of the present disclosure can be understood by the following description and become apparent with reference to the embodiments of the present disclosure. Also, it is obvious to those skilled in the art to which the present disclosure pertains that the objects and advantages of the present disclosure can be realized by the means as claimed and combinations thereof.

In accordance with one aspect of the present disclosure, a system for controlling an engine tone by an artificial intelligence based on a sound quality index of a vehicle, comprises: a sound output device for generating a reinforcing sound to reinforce an engine sound of the vehicle; an engine characteristic measurement sensor for measuring sound source characteristics of the engine sound; an interior noise measurement sensor for detecting interior noise of the vehicle; a signal processing controller that receives signals from the engine characteristic measurement sensor in real time and controls the sound output device such that the engine sound reaches a target tone; and a tone control operation unit connected to the signal processing controller to optimize the sound quality index such that the engine sound reaches the target tone through the artificial intelligence.

The signal processing controller further receives at least one of vehicle driving information emerged through controller area network (CAN) communication or information of the interior noise measured by a microphone.

The signal processing controller outputs an engine tone calculated by the tone control operation unit through an interior audio.

The tone control operation unit performs real-time active control of the engine tone based on deep learning and wherein the active control based on the deep learning determines and outputs an order array and an order level as factors for controlling the target tone based on a target tone requested by a driver and the measured interior noise.

The tone control operation unit performs real-time active control of the engine tone based on deep learning and wherein the active control based on the deep learning determines an order array and an order level as factors for controlling the target tone based on a target tone requested by a driver and the measured interior noise with respect to a noise source required to be reduced and controls an unnecessary frequency band to be reduced.

A sound quality index of the measured interior noise is any one of a powerful index, a pleasant index, a dynamic index, or a sporty index.

The sound output device is at least one of a speaker in an engine room, a speaker in the vehicle interior, or a speaker outside the vehicle.

The system further comprises a proportional-integral-differential (PID) controller for controlling the sound output device such that the engine sound is reinforced by the reinforcing sound due to output of the engine tone.

The reinforcing sound and the target tone are stored as data and reinforcing the engine sound is implemented based on the stored data.

The stored data is active sound design (ASD).

Information of the sound source characteristics of the engine sound is an engine noise characteristic of at least one of engine vibration, combustion pressure, boost pressure, or exhaust pressure.

The vehicle driving information is an engine noise characteristic of at least one of vehicle speed, pedaling, engine speed, or a driving mode.

Input variables of the artificial intelligence comprise at least one of plural vehicle sound characteristics, a target tone requested by the driver, and a driving pattern of the driver.

In accordance with another aspect of the present disclosure, a method for controlling an engine tone by an artificial intelligence of a tone control operation unit based on a sound quality index of a vehicle, comprises: outputting a sound having an engine tone calculated by a signal processing controller based on at least one of vehicle driving information, engine noise characteristic information, or interior noise information, wherein the signal processing controller performs optimizing an index of the sound based on the artificial intelligence.

The sound quality index is output as output variables of the artificial intelligence when an engine order array and an engine order level are changed.

A control value satisfying the output sound quality index is output through a speaker in the vehicle interior.

The output engine sound of the vehicle interior is monitored to calculate a changed sound quality index, and feedback control is performed again.

The engine noise characteristic information is an engine noise characteristic of at least one of engine vibration, combustion pressure, boost pressure, or exhaust pressure.

The vehicle driving information is an engine noise characteristic of at least one of vehicle speed, pedaling, engine speed, or a driving mode.

Input variables of the artificial intelligence comprise at least one of plural vehicle sound characteristics, a target tone requested by the driver, and a driving pattern of the driver.

According to various aspects of the present disclosure as described herein, the following advantageous effects can be obtained:

First, as an index for objectively evaluating a sound of a vehicle is used for setting a target tone, it is possible to perform active control through optimization of various target tones.

Second, there is a strong advantage in that a target tone can be controlled more accurately and quickly because the target tone is optimized by deep learning of an artificial intelligence.

Third, various target tones corresponding to an actual engine sound can be provided in response to a driving mode, thereby providing pleasure of driving and feeling of movement.

Fourth, as the sound output through speakers is feedback again, it is possible to provide an engine tone closer to an actual sound.

Fifth, as the sound source stored previously can be used, the system and method disclosed herein can be easily applied to existing vehicles.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Figure 1:
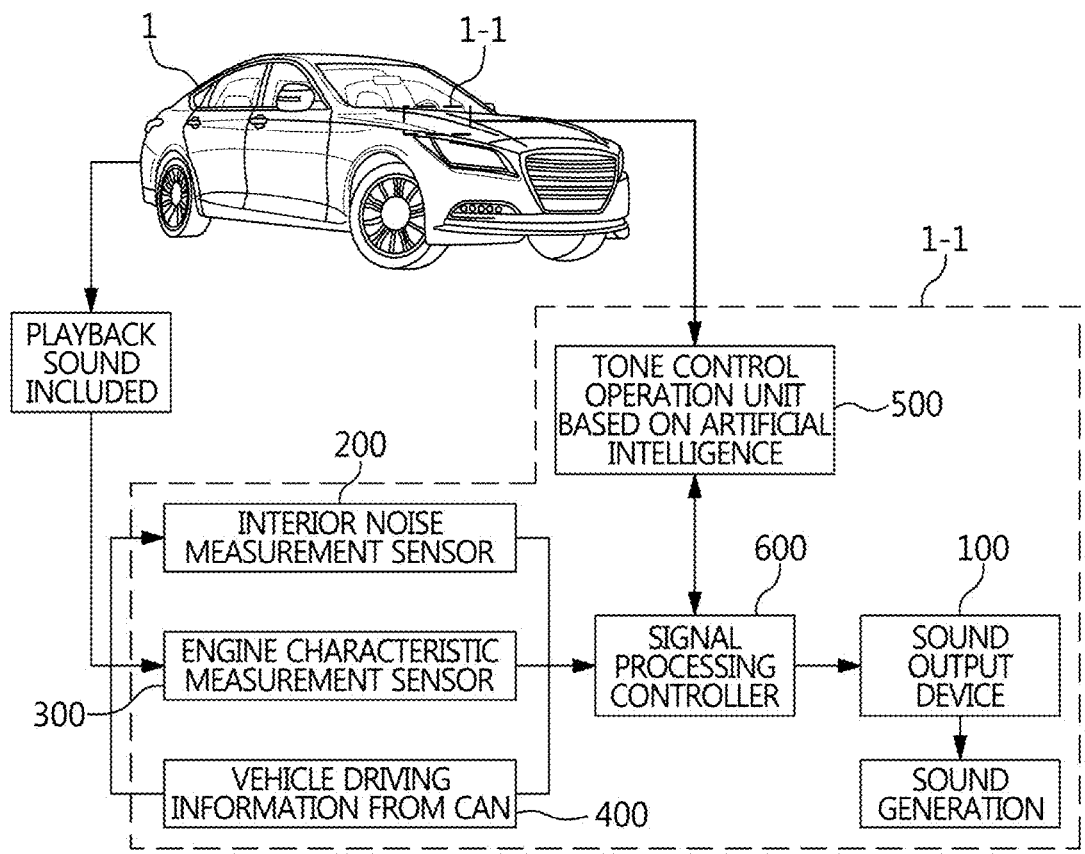
FIG. 1 is a flowchart of a first exemplary embodiment of the present disclosure.

The present disclosure may be implemented in many altered forms and have various embodiments. Therefore, an exemplary specific embodiment is illustrated in the drawings and described in detail in the following description. However, the disclosure herein is not intended to limit the present disclosure to a specific embodiment and should be understood as covering all modifications, equivalents and substitutions falling within the spirit and scope of the disclosure.

Like reference numerals are used to designate like elements throughout the drawings and the description with reference to the drawings.

Although the terms "first," "second," etc. may be used herein to describe various components, these components should not be limited by these terms. These terms are used merely to distinguish one element from another.

For example, a first component may be designated as a second component and similarly a second component may be designated as a first component without departing from the scope of the present disclosure. The term "and/or" includes all combinations or any of a plurality of the associated listed items.

All terms including technical or scientific terms, unless being defined otherwise, have the same meaning generally understood by a person having ordinary skill in the art pertaining to the present disclosure.

The terms that are the same as the ones defined in a commonly-used dictionary should be interpreted as including the meaning consistent with the meaning in the context of the related art and should not be interpreted as being ideally or excessively formal meaning unless they are explicitly defined otherwise herein.

<System for Controlling an Engine Tone by an Artificial Intelligence Based on a Sound Quality Index of a Vehicle>

Firstly, it will be described about a system for controlling an engine tone by an artificial intelligence based on a sound quality index of a vehicle according to a first exemplary embodiment of the present disclosure.

Deep learning which will be described below can be appreciated to be analogous to artificial intelligence learning or machine learning.

FIG. 1 is a flowchart of a first exemplary embodiment of the present disclosure.

A system 1-1 for controlling an engine tone by an artificial intelligence based on a sound quality index of a vehicle 1 comprises a sound output device 100, an interior noise measurement sensor 200, an engine characteristic measurement sensor 300, vehicle driving information detector 400 from a controller area network, a tone control operation unit 500 and a signal processing controller 600.

The sound output device 100 refers to an output device for outputting a sound source generated based on values from the engine characteristic measurement sensor.

More specifically, the sound output device 100 refers to a sound output system for generating a reinforcing sound to reinforce an engine sound of a vehicle.

The sound output device 100 may be at least one of a speaker in an engine room, a speaker in the vehicle interior, or a speaker outside the vehicle.

In other words, the sound output device 100 may be arranged in at least one of the interior of the engine room, the interior of the vehicle, or the outside of the vehicle.

The sound output device 100 arranged outside the vehicle may be contemplated for the purpose of pedestrian protection.

The sound output device 100 may be provided for a specific frequency band output and may be provided in various types such as a thin type device or a membrane type replayable device.

The interior noise measurement sensor 200 measures interior noise of the vehicle.

As an example of the interior noise measurement sensor 200, a microphone (not shown) capable of measuring interior noise may be arranged in the vehicle interior.

The microphone can measure change of a tone of the vehicle interior noise in real time wherein a plurality of microphones can be arranged in the vehicle.

It is to be noted that the interior noise which will be described below refers to a driving performance sound including an engine tone and an exhaust sound, which are heard in the vehicle interior and related to vehicle driving in a state where an engine of the vehicle is started, but it is different from a radio sound or a music sound provided in a car entertainment system.

On the other hand, a driving performance sound desired by a driver is a target tone.

The interior noise measurement sensor 200 may measure a reference signal for proportional-integral-differential controller (PID) control. (See FIG. 5)

The interior noise measurement sensor 200 can be used for measuring change of an engine tone of the vehicle and measuring a difference between the engine tone and the target tone.

More specifically, the interior noise measurement sensor 200 is used for determining a sound domain to be reinforced and a sound domain to be reduced in order to correct the driving performance sound so as to be close to the target tone.

The engine characteristic measurement sensor 300 measures characteristics of the sound source of the engine sound.

The information of the sound source characteristics of the engine sound refers to power characteristic information capable of determining the tone of the engine sound.

The information of the sound source characteristics of the engine sound may be engine noise characteristic of at least one of engine vibration, combustion pressure, boost pressure, or exhaust pressure.

The engine noise characteristic refers to noise characteristic of a power system which is detected by the engine characteristic measurement sensor 300.

In other words, the sound source characteristics of the engine sound can be determined from at least one of vibration data, combustion pressure data, boost pressure data, exhaust pressure data, or intake pressure data.

The engine characteristic measurement sensor 300 is a sensor for measuring the information of the sound source characteristics of the engine sound.

The engine characteristic measurement sensor 300 may be a vibration sensor, a combustion pressure sensor, a boost pressure sensor, an exhaust pressure sensor, an intake pressure sensor, or the like.

In particular, the vibration sensor may comprise a uniaxial accelerometer (not shown) or a multiaxial accelerometer (not shown).

The vehicle driving information may be engine noise characteristic of at least one of vehicle speed, pedaling, engine speed (RPM), or a driving mode.

The vehicle driving information detector 400 from the CAN (Controller Area Network) is vehicle driving information which is necessary for real-time control of the vehicle.

The vehicle driving information detector 400 from the CAN makes it possible to determine driving will and driving pattern of the driver.

A command mediator for transmitting driving information relating to the vehicle driving of the driver to the vehicle in real time may include a steering wheel, an accelerator pedal, a brake pedal, a gear knob (paddle shift), a driving mode button and the like.

The driver may vary the degree of depressing the accelerator pedal or the brake pedal depending on a given situation.

Upon attempting to overtake a front vehicle, the driver instantaneously depresses the accelerator pedal deeply. At this time, a gear box of the vehicle shifts down the gear in response to the driver's acceleration will to increase the engine speed, thereby increasing vehicle speed.

On the other hand, the driver may sometimes pursue sports driving that prioritizes running, or otherwise want comfort driving that prioritizes ride comfort.

This is solved by selecting a driving mode through a driving mode system mounted on the vehicle.

The driving mode is a given setting mode for achieving the driving will of the driver.

The driving performance sound of the vehicle also needs to be changed in response to the selected driving mode.

The driving performance sound corresponds to a sound quality index 700 which refers to the target tone.

The sound quality index 700 can be selected directly by the driver.

Next, the tone control operation unit 500 according to an exemplary embodiment of the present disclosure will be described in detail.

Figure 2:
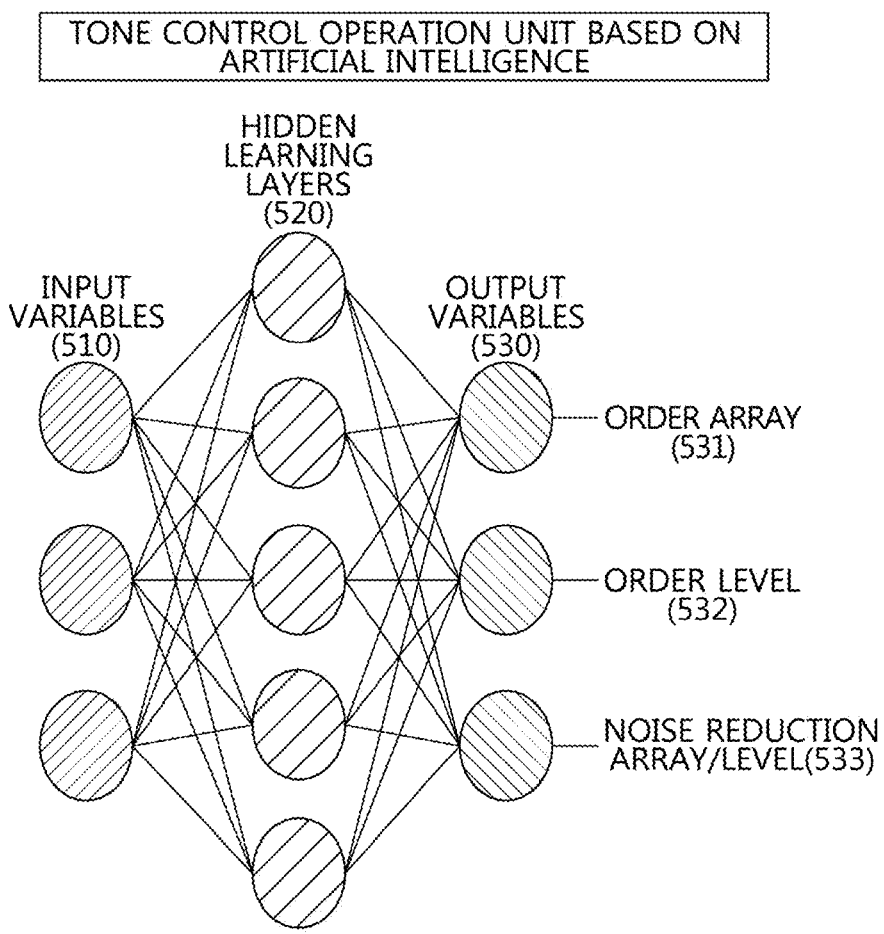
FIG. 2 is a schematic diagram of a tone control operation unit 500 according to an exemplary embodiment of the present disclosure.

FIG. 2 is a schematic diagram of the tone control operation unit 500 according to an exemplary embodiment of the present disclosure.

The tone control operation unit 500 according to an exemplary embodiment of the present disclosure may be a processor (e.g., computer, microprocessor, CPU, ASIC, circuitry, logic circuits, etc.). The processor may include an associated non-transitory memory storing software instructions which, when executed by the processor, provides the functionalities of an input variables module 510 and a hidden learning layers module 520. Herein, the memory and the processor may be implemented as separate semiconductor circuits. Alternatively, the memory and the processor may be implemented as a single integrated semiconductor circuit. The processor may embody one or more processor(s).

The tone control operation unit 500 outputs output variables 530. In this case, the output variables 530 means an order array 531, an order level 532, a noise reduction array and a noise reduction level 533 outputted as the result of the hidden learning layers module 520.

The input variables module 510 of the tone control operation unit 500 collects data values input from the interior noise measurement sensor 200, the engine characteristic measurement sensor 300 and the vehicle driving information detector 400 from the CAN, as described above. In this case, the input variables module 510 means the input values provided in plural sensors.

More specifically, input variables of the artificial intelligence comprise at least one of plural vehicle sound characteristics, a target tone requested by the driver, and a driving pattern of the driver.

The tone control operation unit 500 is capable of real-time active control of the engine tone based on deep learning.

The active control based on the deep learning determines and outputs the order array 531 and the order level 532 of the output variables 530 as factors for controlling the target tone based on a target tone requested by the driver and the measured interior noise.

On the other hand, the active control based on the deep learning determines the order array 531 and the order level 532 of the output variables 530 as factors for controlling the target tone based on a target tone requested by the driver and the measured interior noise with respect to a noise source required to be reduced and controls an unnecessary frequency band to be reduced.

The hidden learning layers module 520 of the tone control operation unit 500 analyzes data of the input variables of the input variables module 510 by means of the deep learning and output the analyzed data as the output variables 530.

The order array 531 of the output variables 530 refers to an array of frequencies arranged depending on the engine speed (i.e. Revolution per Minute) and the order level 532 of the output variables 530 refers to magnitude of the frequencies of the order array.

The tone control operation unit 500 outputs unnecessary noise to the noise reduction array and the noise reduction level 533 of the output variables 530.

Figure 3:
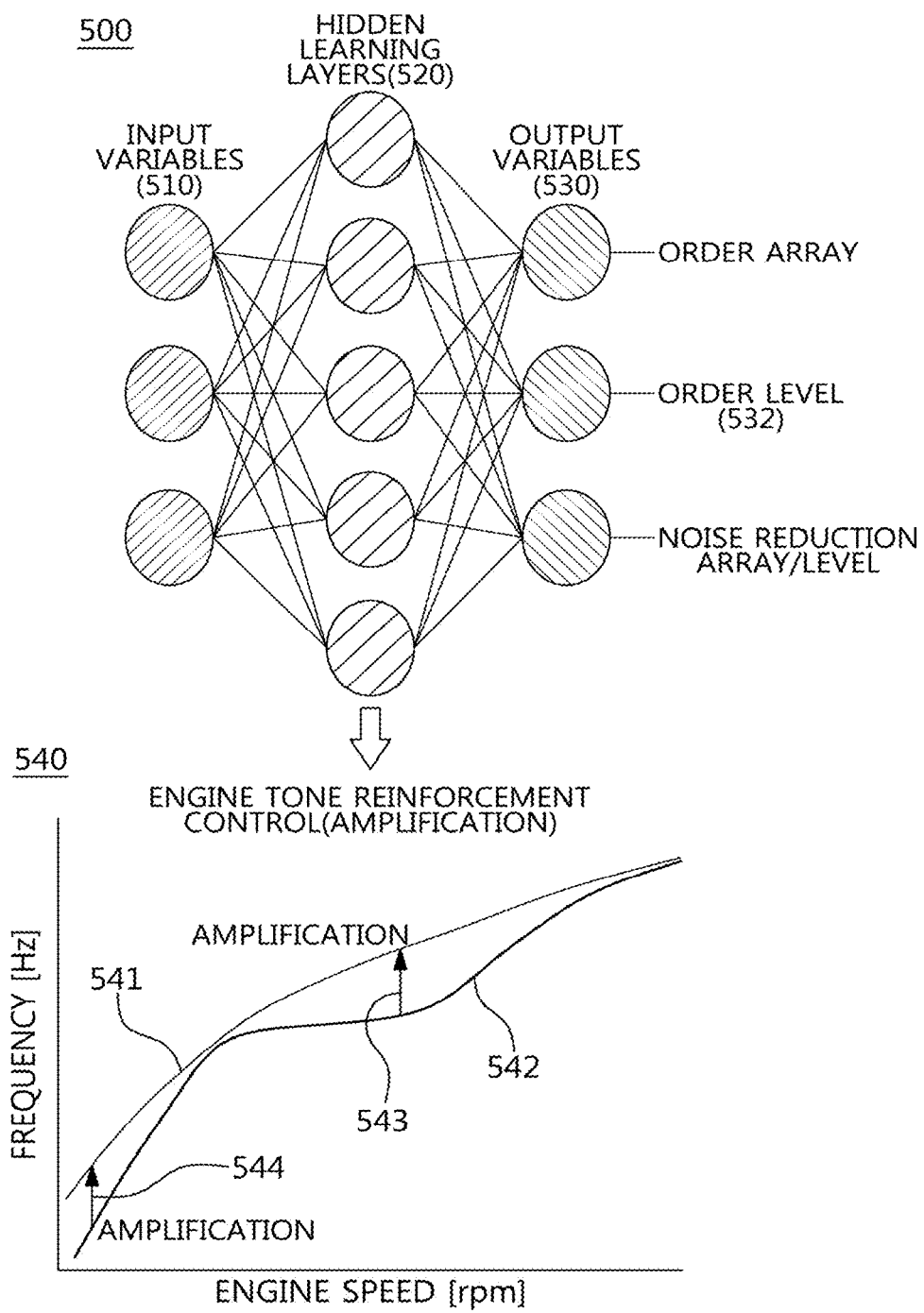
FIG. 3 is a graph of engine tone reinforcement control of a tone control operation unit 500 according to an exemplary embodiment of the present disclosure.

FIG. 3 is a graph 540 of engine tone reinforcement and amplification control of the tone control operation unit 500 according to an exemplary embodiment of the present disclosure.

As shown in FIG. 3, when the driver accelerates by operating the accelerator pedal of the vehicle, an engine tone 542 before being amplified is amplified such that a first middle band 543 and a first low band 544 are amplified and then changed into an engine tone 541 after being amplified.

The tone control operation unit 500 utilizes the input variables of the input variables module 510 and seizes both the first middle band 543 and the first low band 544 which need to be amplified in the engine tone 542 before being amplified and then amplifies frequencies of the corresponding sections. In this case, the amplification is made of the frequency magnitude of the order level 532 of the output variables 530.

In other words, the tone control operation unit 500 extracts components of the order based on a fast Fourier transform (FFT) analysis and determines necessary order array and order level and then reinforces level of the engine tone in the acceleration section.

Figure 4:
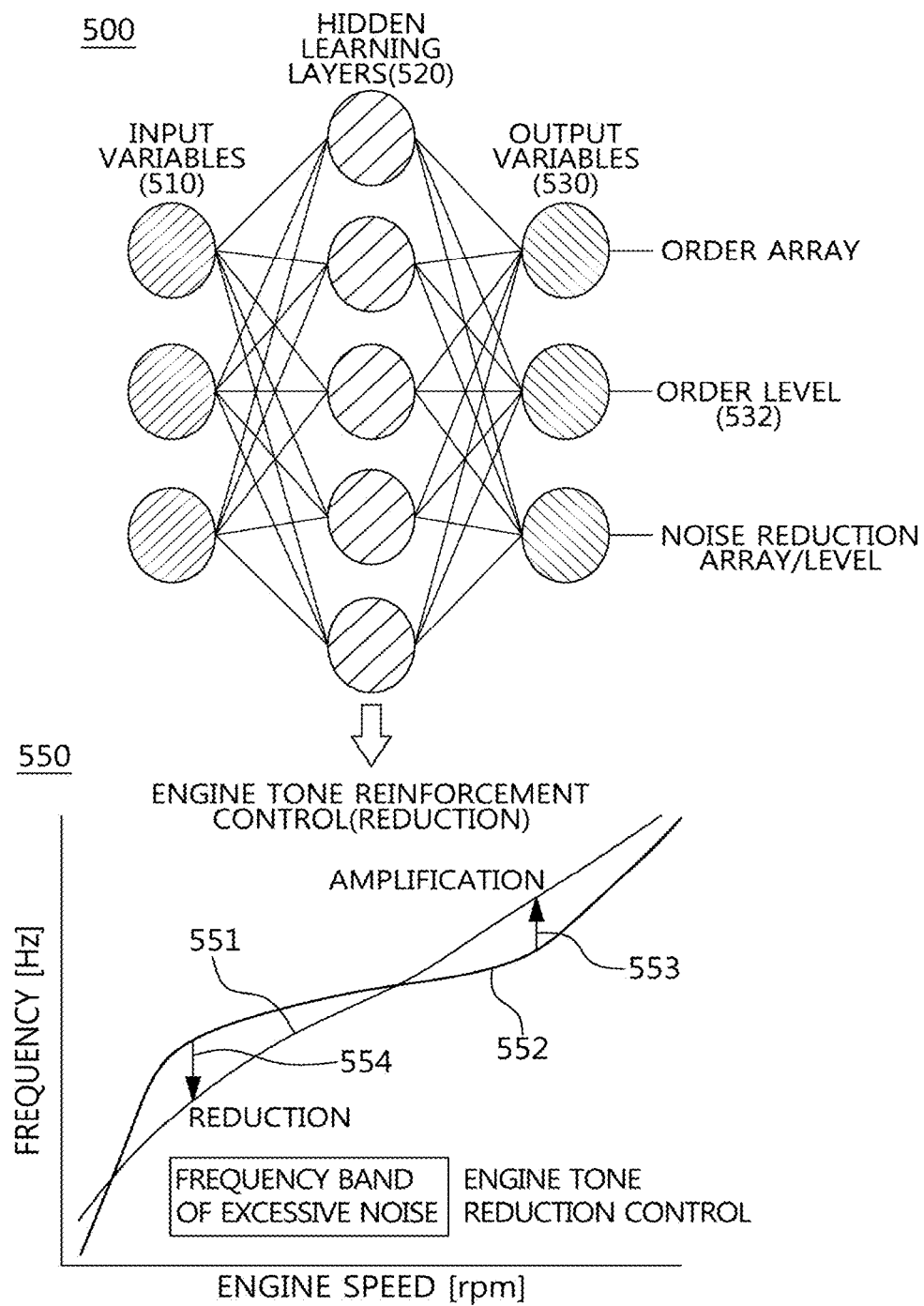
FIG. 4 is a graph of engine tone reinforcement and noise reduction control of a tone control operation unit 500 according to an exemplary embodiment of the present disclosure.

FIG. 4 is a graph 550 of engine tone reinforcement and noise reduction control of the tone control operation unit 500 according to an exemplary embodiment of the present disclosure.

The graph 550 of the engine tone reinforcement and noise reduction control is amplified together in the graph 540 of the engine tone amplification control to reduce a second low band 554 where noise is excessively generated. In this case, the reduction is made of the frequency magnitude of the order level 532 of the output variables 530.

This is to perform noise reduction control in consideration of the amplified tone, which can be accomplished by applying a reverse phase output of the frequency band in question.

In other words, this generates the reverse phase output reducing the order array and the order level of a section that is necessary for keeping balance of sound pressure in the vehicle interior and linearity of the order.

A second middle band 553 which is a section lacking amplification in the graph 540 of the engine tone reinforcement and amplification control is forced to be further amplified such that the engine tone 552 before being optimized becomes the engine tone 551 having been optimized.

As a result, the optimized engine tone 551 is changed into a form increasing linearly in proportion to the engine speed.

Figure 5:
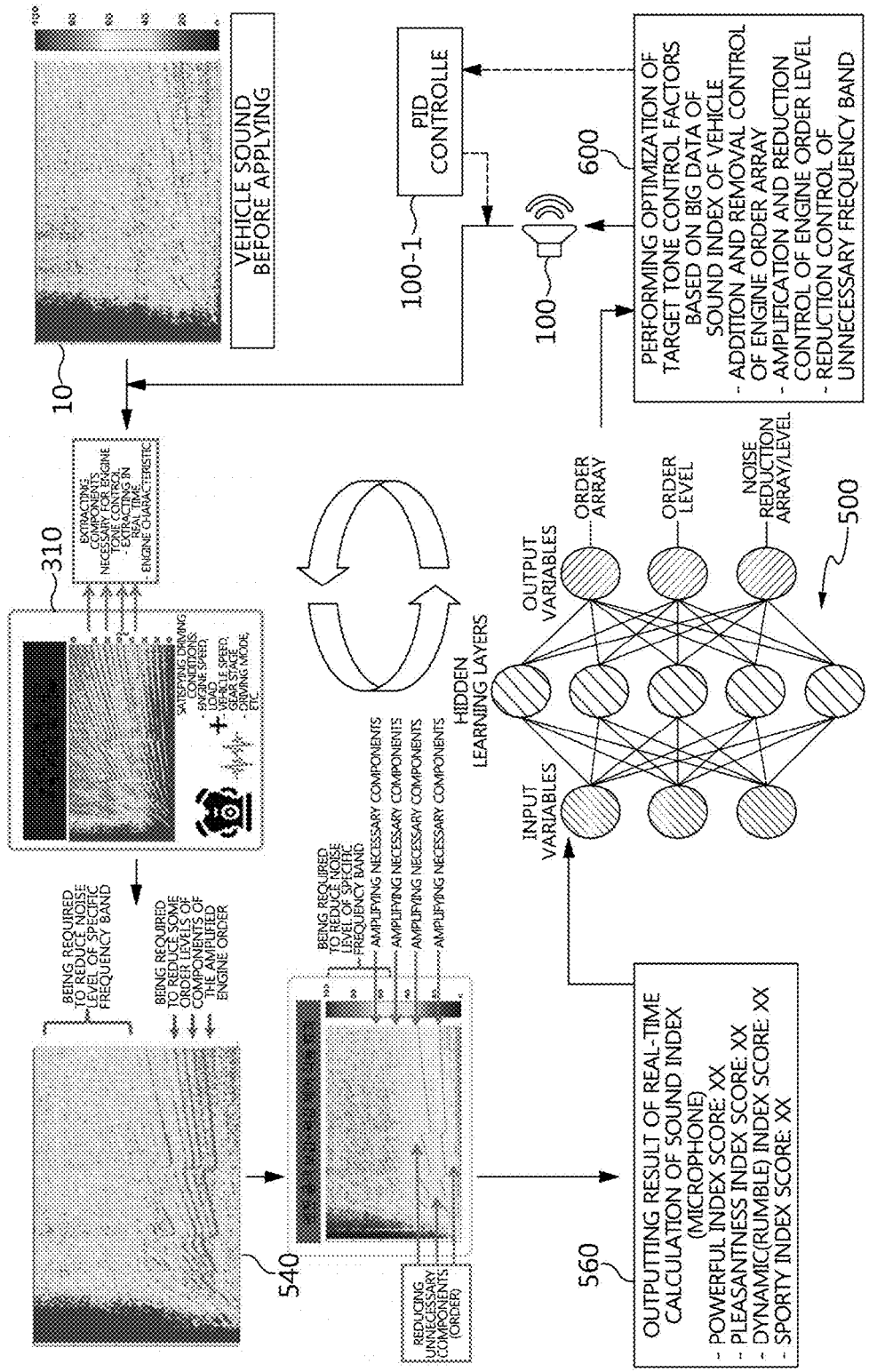
FIG. 5 is a diagram illustrating operational effects of the entire algorithm according to an exemplary embodiment of the present disclosure.

Such operational effects are illustrated in FIG. 5.

FIG. 5 is a diagram illustrating the operational effects of the entire algorithm according to an exemplary embodiment of the present disclosure. In this case, the algorithm is loaded in the signal processing controller 600 as a whole program or as a partial program in each of the signal processing controller 600 and the tone control operation unit 500.

A vehicle sound 10 before applying the algorithm of the present disclosure is shown at the upper right side of FIG. 5.

First, components necessary for engine tone control are extracted from an engine characteristic measurement signal 310 of the engine characteristic measurement sensor 300 in real time. (See FIG. 7)

Here, vibration frequency, combustion pressure, exhaust pressure, boost pressure, accelerometer signal and other engine characteristic measurement data and information such as engine speed (RPM), vehicle speed, gear stage and driving mode are utilized as the real-time detecting values of an engine characteristic measurement signal 310.

The graph 540 of the engine tone reinforcement and amplification control is a result of amplifying the engine tone as FIG. 3.

The graph 540 of the engine tone reinforcement and amplification control shows that it is necessary to reduce noise of a specific frequency band and that some order levels of components of the amplified engine order are required to be reduced.

The graph 550 of the engine tone enhancement and reduction control is a result of amplifying the engine tone as FIG. 4. Therefore, the graph 550 is a result of amplifying necessary components and reducing unnecessary components.

As a result, output values 560 of results of real-time measurement of sound quality output results of real-time calculation of the sound quality index and are given to the tone control operation unit 500 as input variables.

The output values 560 of results of real-time measurement of the sound quality may be any one of a powerful index score, a dynamic index score, a pleasant index score, or a sporty index score. In this case, the index is illustrated by a sound quality index 700 of FIG. 6.

The tone control operation unit 500 outputs results acquired from information of the output values 560 of results of real-time measurement of the input sound quality to the signal processing controller 600.

The signal processing controller 600 performs control based on a vehicle sound quality index big data using from information of the output values 560. The control of a vehicle sound quality index big data performs addition and removal control of an engine order array, amplification and reduction control of an engine order level and reduction control of unnecessary frequency bands and then outputs result values of these control to the sound output device 100.

The sound output from the sound output device 100 is feedback controlled while being reflected to the engine characteristic measurement signal 310 again.

Meanwhile, the system 1-1 for controlling an engine tone by an artificial intelligence based on a sound quality index of a vehicle may comprise a PID controller 100-1. In this case, the PID controller 100-1 connects the signal processing controller 600 and the sound output device 100.

The sound output device 100 may be controlled by the PID controller 100-1.

The PID controller 100-1 reinforces the engine sound by means of the reinforcing sound by output of the engine tone.

Figure 6:
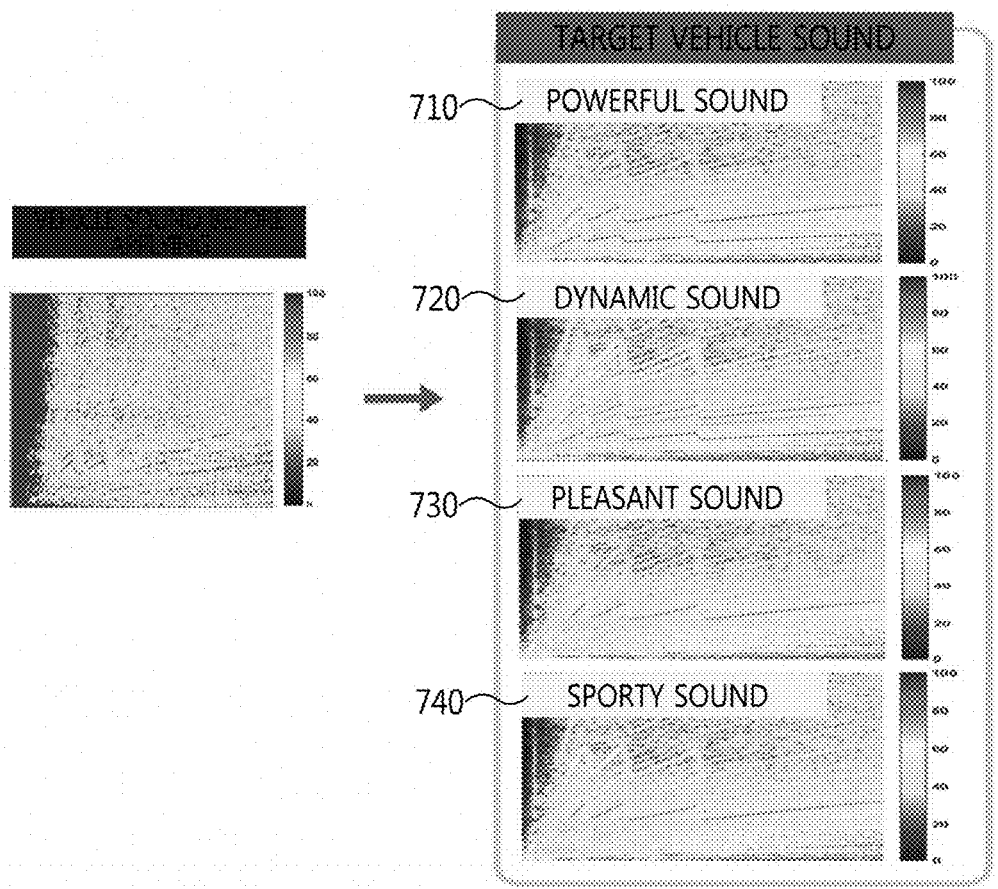
FIG. 6 is a diagram illustrating a sound quality index 700 according to an exemplary embodiment of the present disclosure.

FIG. 6 is a diagram illustrating the sound quality index 700 according to an exemplary embodiment of the present disclosure.

In this case, the sound quality index 700 of the measured interior noise is any one of a powerful index 710, a dynamic index 720, a pleasant index 730, or a sporty index 740.

The driver may directly select as a target tone any one out of the powerful index 710, the dynamic index 720, the pleasant index 730, or the sporty index 740.

On the other hand, it is possible to configure the sound quality index 700 such that any one of the powerful index 710, the dynamic index 720, the pleasant index 730, or the sporty index 740 is selected automatically in response to selection of a desired driving mode by the driver.

The signal processing controller 600 outputs an engine tone calculated by the tone control operation unit 500 through an interior audio of the vehicle.

Consequently, if the driver pursues a sound for the sports driving, the signal processing controller 600 may output stronger sound than the pleasant index 730, such as the powerful index 710, the dynamic index 720 or the sporty index 740.

On the contrary, if the driver wants a sound for comfort driving, the signal processing controller 600 may output mild sound like the pleasant index 730 through the sound output device 100.

On the other hand, the signal processing controller 600 further receives at least one of vehicle driving information of the vehicle driving information detector 400 emerged through the CAN (Controller Area Network) communication or information of the interior noise measured by the microphone of the interior noise measurement sensor 200.

The signal processing controller 600 receives the measured signal from the engine characteristic measurement sensor 300 in real time and controls the sound output device 100 so as to reach the target tone desired by the driver.

In this case, the tone control operation unit 500 is connected to the signal processing controller 600 and optimizes the sound quality index 700 by using the vehicle sound quality index big data using from information of the output values 560 so as to reach the target tone through an artificial intelligence.

More specifically, the tone control operation unit 500 can amplify and reduce necessary engine order arrays and order levels and calculate unnecessary frequency bands in real time by using the order array 531, the order level 532 and the noise reduction array and a noise reduction level 533 of the output variables 530.

In other words, the tone control operation unit 500 may control sound pressure enhancement for reinforcing the engine tone through the engine characteristic measurement sensor 300, or otherwise may control sound pressure reduction for noise reduction control.

Accordingly, it is possible to maintain balance of sound pressure in the vehicle interior and realize the target tone by reinforcing a necessary tone and controlling unnecessary noise to be reduced in real time.

<Method for Controlling an Engine Tone by an Artificial Intelligence Based on a Sound Quality Index of a Vehicle>

Next, it will be described about the entire algorithm of an exemplary embodiment of the present disclosure.

Figure 7:
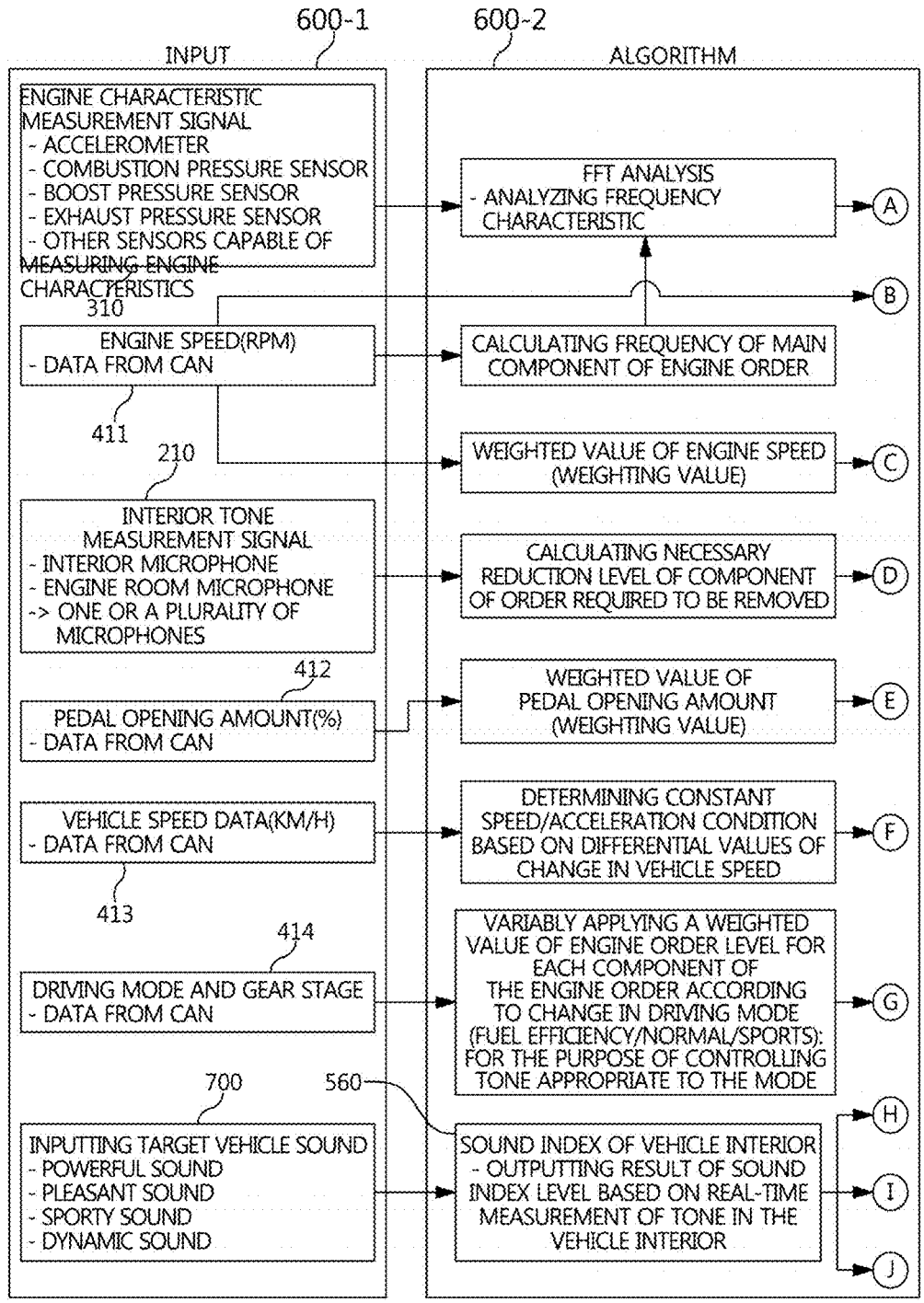
FIGS. 7, 8, and 9 are diagrams of the entire algorithm of a first exemplary embodiment of the present disclosure.
Figure 8:
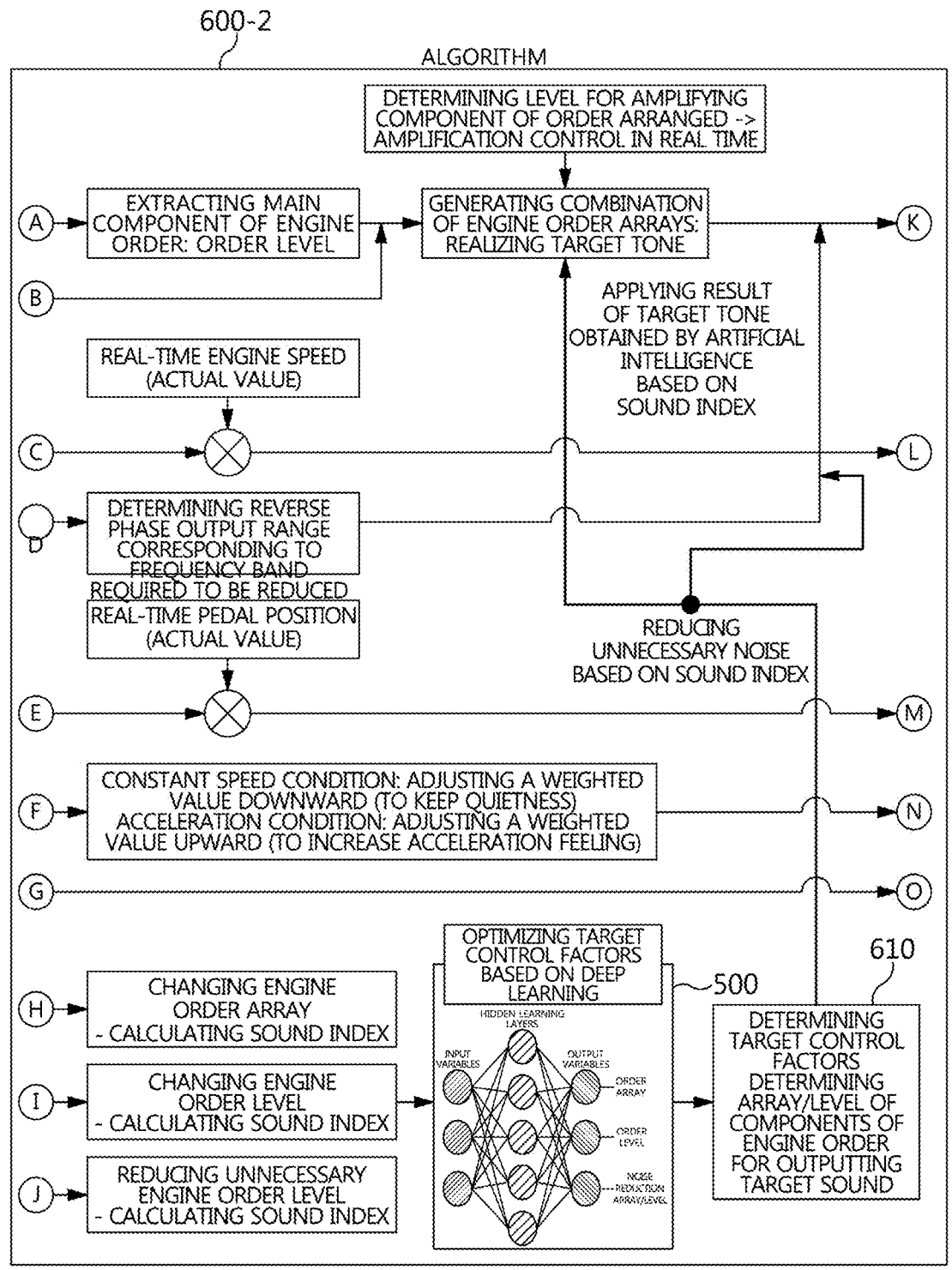
Figure 9:
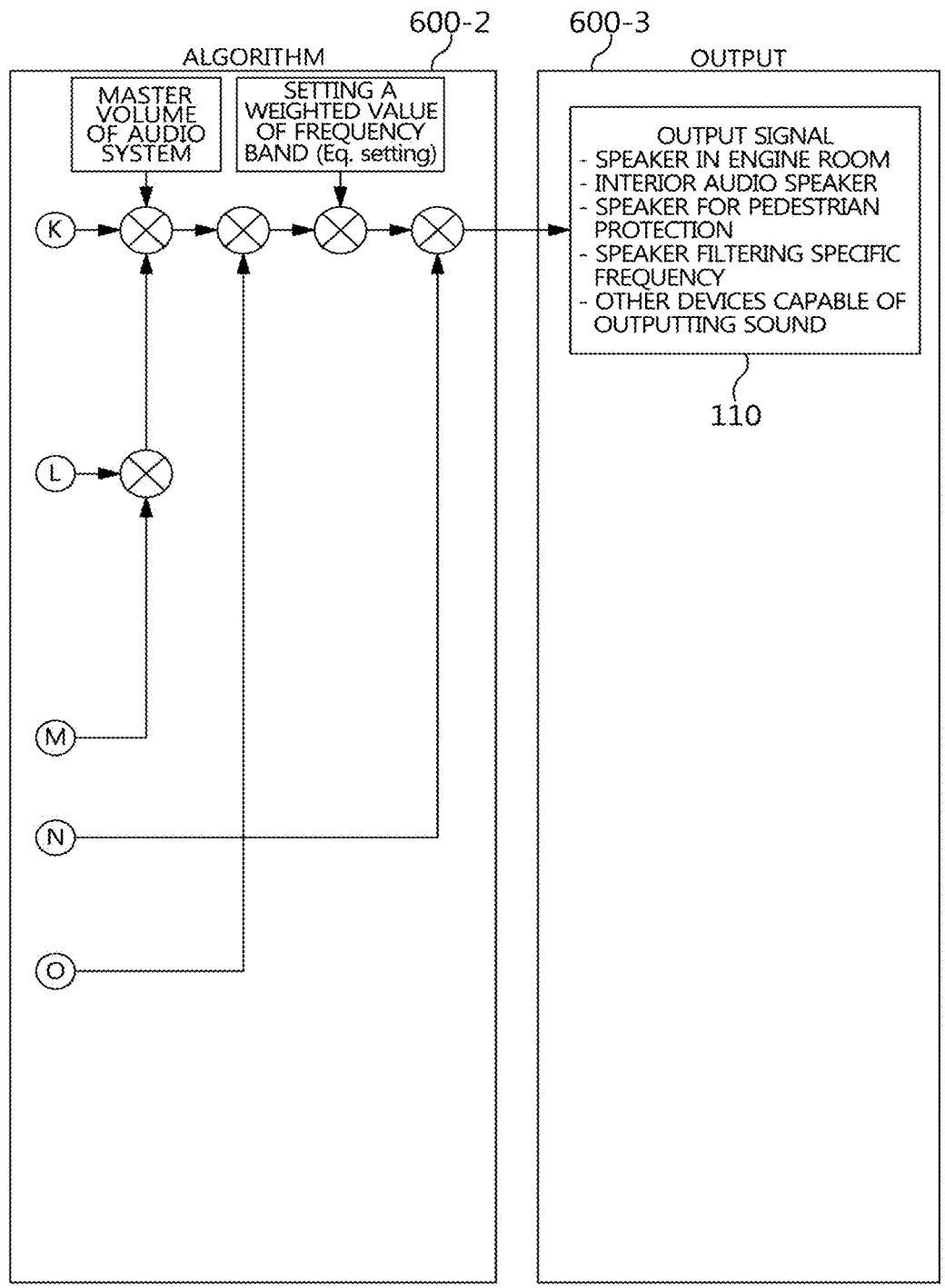

FIGS. 7 to 9 are diagrams of the entire algorithm of a first exemplary embodiment of the present disclosure. In this case, the algorithm of the first exemplary embodiment comprises an input device 600-1, an algorithm device 600-2 and an output device 600-3.

The operation of the input device 600-1 is as follows.

Input signal of the input device 600-1 includes engine characteristic measurement signal 310, engine speed 411, interior tone measurement signal 210, pedal opening amount 412, vehicle speed data 413, driving modes and gear stages 414 and a sound quality index 700.

The engine characteristic measurement signal 310 includes data values obtained from an accelerometer, a combustion pressure sensor, a boost pressure sensor, an exhaust pressure sensor and other engine characteristic measurement sensors 300.

The engine speed 411 of the vehicle driving information detector 400 is data emerged through the CAN.

The interior tone measurement signal 210 of the interior noise measurement sensor 200 includes data values obtained from an interior microphone arranged in the vehicle interior and an engine room microphone arranged in an engine room respectively.

In this case, a plurality of interior microphones and a plurality of engine room microphones may be provided.

The pedal opening amount 412, the vehicle speed data 413, the driving modes and the gear stages 414 are data relating to the vehicle driving information detector 400 from the CAN.

The sound quality index 700 is a target tone selected directly by the driver.

The operation of the algorithm device 600-2 is as follows.

A weighted value of engine speed that is obtained from the engine speed 411 is reflected to master volume of an audio system together with the real time engine speed wherein a weighted value of the pedal opening amount that is obtained from the pedal opening amount 412 and a value of the real time position of the pedal are reflected thereto.

A constant speed or acceleration condition is determined from the vehicle speed data 413 based on differential values of change in the vehicle speed wherein in case of the constant speed condition, the weighted value is adjusted downward to keep quietness whereas in case of the acceleration condition, the weighted value is adjusted upward to increase acceleration feeling. Then, the adjusted weighted value is reflected immediately before output of the sound output device 100.

On the other hand, a weighted value of the engine order level for each component of the engine order according to change in the driving mode, which is obtained from the driving mode and the gear stages 414, is applied variably and reflected between setting master volume of the audio system and setting a weighted value of the frequency band.

Frequency characteristic is analyzed (FFT analysis) from the engine characteristic measurement signal 310 wherein frequencies of components of the main engine order that are obtained from the engine speed 411 are calculated and reflected.

The order level is derived by extracting a main component of the engine order, combination of the engine order arrays is generated, and the engine speed 411 is reflected in the process of realizing the target tone.

When the order level is derived, a level for amplifying components of the engine order arranged like the graph 540 of the engine tone reinforcement and amplification control is determined and controlled to be amplified in real time. (See FIG. 3.)

At this time, a result 610 of the target tone obtained by the tone control operation unit 500 by means of the artificial intelligence based on the sound quality index is reflected.

In other words, when the driver selects the sound quality index 700, a tone in the vehicle interior is measured in real time and a result value of the interior noise measurement sensor 200 corresponding to the level of the sound index is output to the input device 600-1 as input data.

Next, input variables 510 containing information on change in the engine order array, change in the engine order level and reduction of unnecessary order level, which is obtained through calculation of the sound index, are input to the tone control operation unit 500.

The tone control operation unit 500 outputs an order array 531, an order level 532 and a noise reduction array and noise reduction level 533 as output variables 530 for optimizing target tone control factors based on depth learning through the hidden learning layers 520. The order array 531 and the order level 532 out of the final control factors output by the tone control operation unit 500 are reflected in realizing the target tone. (See FIG. 2 to FIG. 5.)

On the other hand, the noise reduction array and noise reduction level 533 out of the final control factors output by the tone control operation unit 500 is used for calculating components of the order required to be removed from the interior tone measurement signal 210, that is, necessary reduction level, and determining a reverse phase output range corresponding to a frequency band required to be reduced and then applying the determined reverse phase output range to master volume of the audio system. (See FIG. 4.)

The operation of the output device 600-3 is as follows.

The data value closer to the target tone by the tone control operation unit 500 is output through the master volume of the audio system and finally through a sound output 110 of the sound output device 100.

The sound output 110 from the sound output device 100 is feedback controlled so as to be reflected again to the engine characteristic measurement signal 310 and the interior tone measurement signal 210 in accordance with the algorithm as described above.

The driver can enjoy a vehicle sound of the desired target tone more quickly and accurately by virtue of the feedback control with the above-mentioned tone control operation unit 500 interposed.

Figure 10:
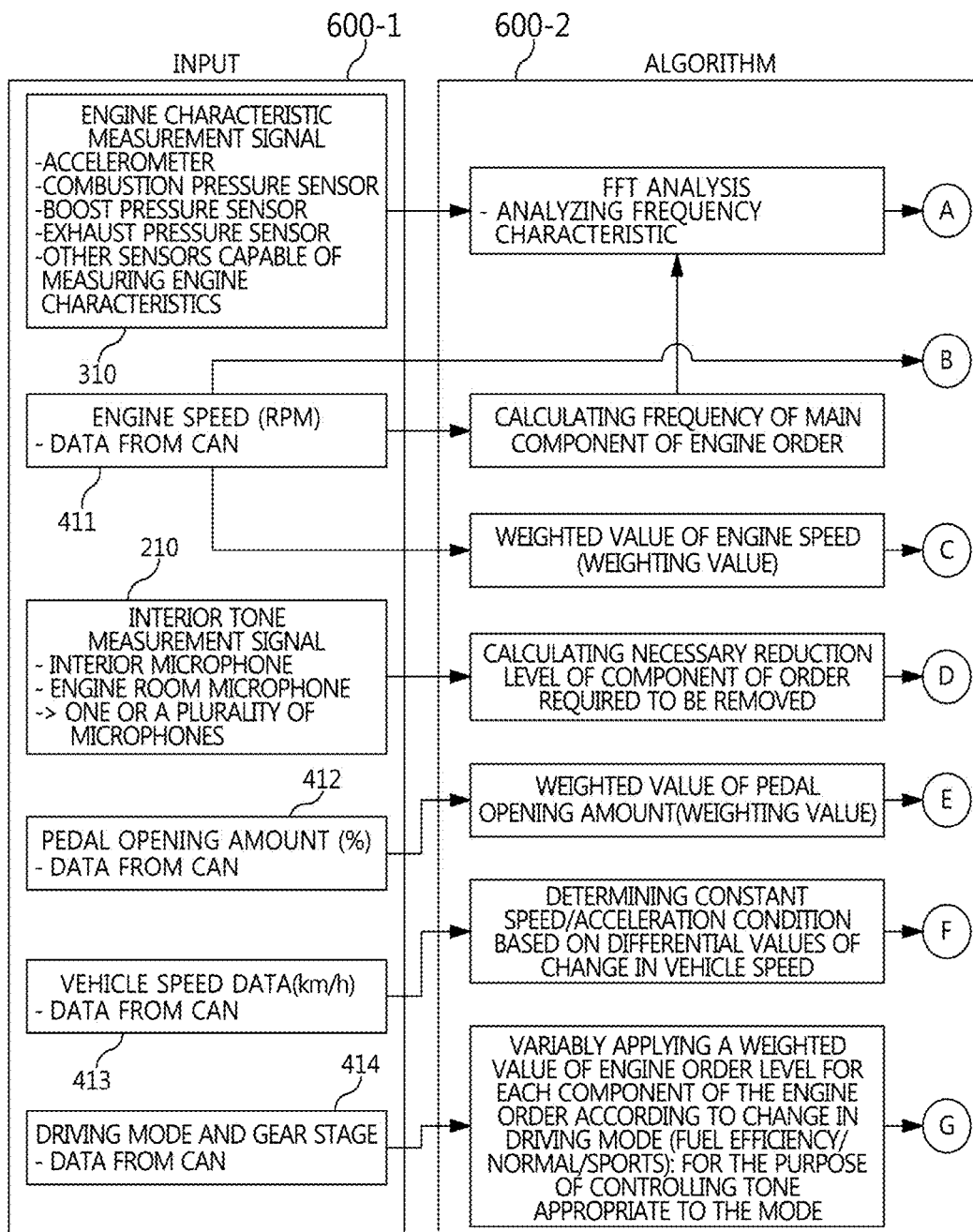
FIGS. 10, 11, and 12 are diagrams of the entire algorithm of a second exemplary embodiment of the present disclosure.
Figure 11:
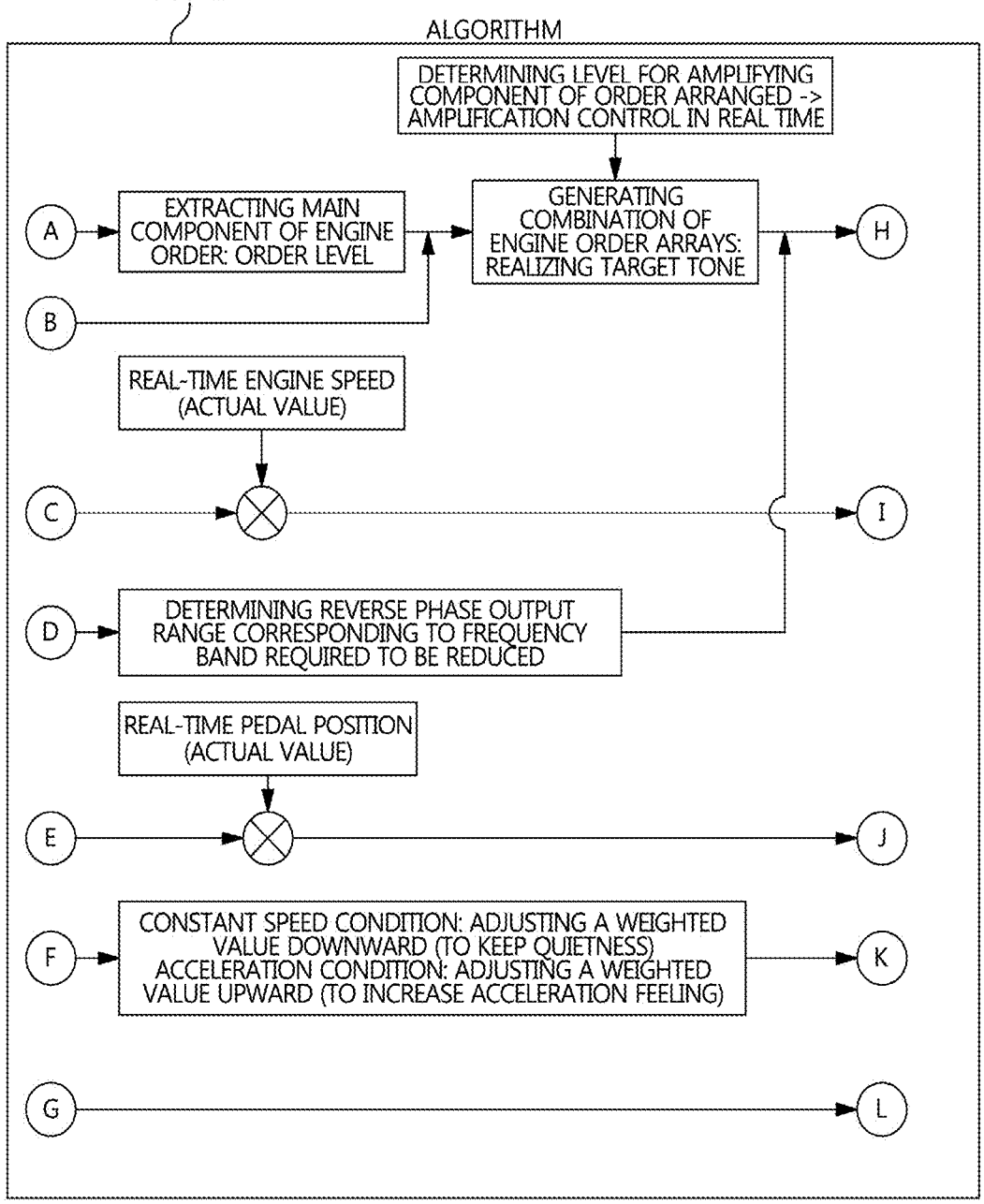
Figure 12:
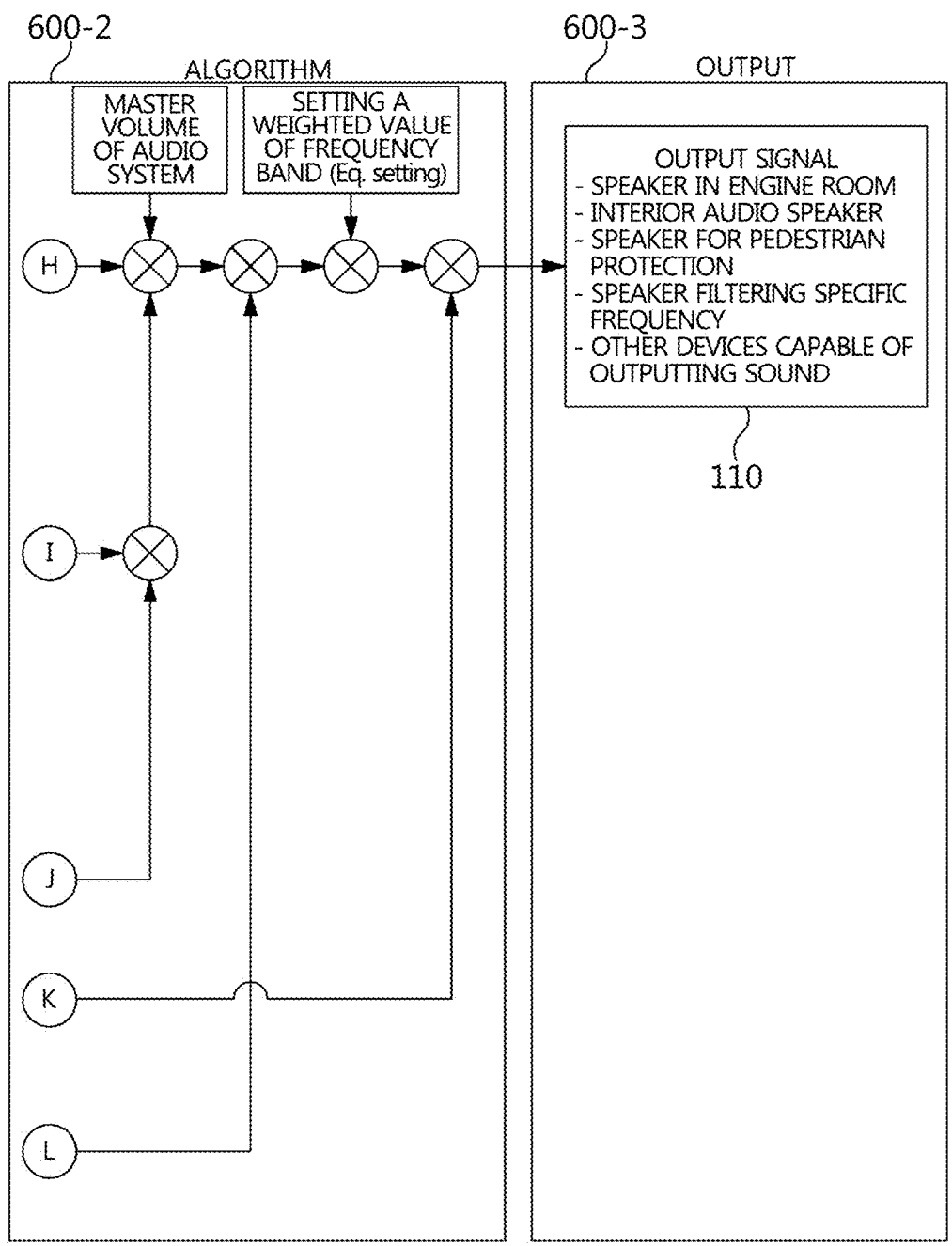

On the other hand, FIGS. 10 to 12 are diagrams of the entire algorithm of a second exemplary embodiment of the present disclosure. In this case, the algorithm is executed through the input device 600-1, the algorithm device 600-2 and the output device 600-3 as in the algorithm of the first exemplary embodiment.

However, the algorithm of the second exemplary embodiment differs from the algorithm of the first exemplary embodiment does not include the sound quality index 700. Also the algorithm of the second exemplary embodiment differs from the algorithm of the first exemplary embodiment does not reflect the result 610 of the target tone obtained by the tone control operation unit 500.

Figure 13:
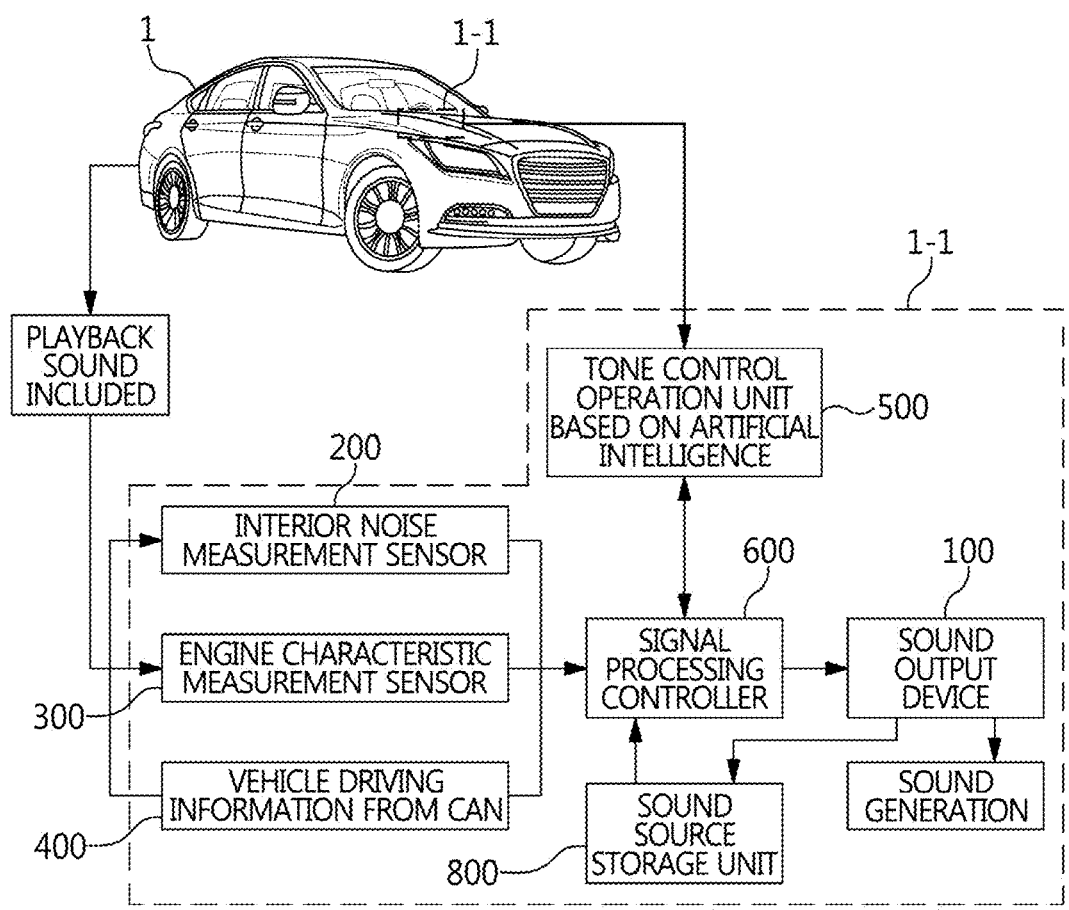
FIG. 13 is a diagram of a system including a sound source storage unit according to an exemplary embodiment of the present disclosure.

On the other hand, FIG. 13 is a diagram of a system including a sound source storage unit according to an exemplary embodiment of the present disclosure.

Referring to FIG. 13, the system for controlling an engine tone by an artificial intelligence based on a sound quality index of a vehicle may comprise a sound source storage unit 800.

The sound source storage unit 800 may store the reinforcing sound and the target tone as data. In this case, the sound output device 100 may be connected to the sound source storage unit 800 to reinforce the engine tone based on the data stored in the sound source storage unit.

In this case, the data stored in the sound source storage unit 800 is preferably available in ASD (active sound design).

The sound source storage unit 800 may include at least one type of storage medium among a flash memory type, a hard disk type, a multimedia card micro type such as an SD or XD memory, a random access memory (RAM), a static RAM (SRAM), a read-only memory (ROM), an electrically erasable programmable read-only memory (EEPROM), a programmable read-only memory (PROM), a magnetic memory, a magnetic disk, and an optical disk, etc.

Although the present disclosure has been described in the foregoing with reference to the drawings illustrated by way of example, the present disclosure is not limited to the disclosed embodiments, and it will be apparent to those of ordinary skill in the art that various modifications and variations can be made to the present disclosure without departing from the spirit and scope of the disclosure. Therefore, such modifications or variations fall within the scope of the present disclosure as claimed and the scope of the present disclosure should be interpreted based on the appended claims.

What is claimed is:

1. A system for controlling an engine tone by an artificial intelligence based on a sound quality index of a vehicle, comprising:
   a sound output device for generating a reinforcing sound to reinforce an engine sound of the vehicle;
   an engine characteristic measurement sensor for measuring sound source characteristics of the engine sound;
   an interior noise measurement sensor for detecting interior noise of the vehicle;
   a signal processing controller that receives signals from the engine characteristic measurement sensor in real time and controls the sound output device such that the engine sound reaches a target tone; and a processor connected to the signal processing controller to optimize the sound quality index such that the engine sound reaches the target tone through the artificial intelligence wherein the sound quality index is the target tone corresponding to a driving performance sound, wherein the processor performs real-time active control of the engine tone based on deep learning, wherein the active control based on the deep learning determines and outputs an order array and an order level as factors for controlling the target tone based on a target tone requested by a driver and the measured interior noise, wherein the order array is an array of frequencies and the order level is magnitudes of the frequencies of the order array, and wherein the order array and the order level are determined as necessary components of an order, and the necessary components of the order are extracted based on a fast Fourier transform (FFT) analysis.

2. The system according to claim 1, wherein the signal processing controller further receives at least one of vehicle driving information emerged through controller area network (CAN) communication or information of the interior noise measured by a microphone.

3. The system according to claim 1, wherein the signal processing controller outputs an engine tone calculated by the processor through an interior audio.

4. The system according to claim 1,
wherein the active control based on the deep learning determines the order array and the order level as the factors for controlling the target tone based on the target tone requested by the driver and the measured interior noise with respect to a noise source required to be reduced, and controls an unnecessary frequency band to be reduced.

5. The system according to claim 1, wherein the sound quality index is any one of a powerful index, a pleasant index, a dynamic index, or a sporty index and represents a desired driving mode to be selected by the driver.

6. The system according to claim 1, wherein the sound output device is at least one of a speaker in an engine room, a speaker in the vehicle interior, or a speaker outside the vehicle.

7. The system according to claim 1, further comprising a proportional-integral-differential (PID) controller for controlling the sound output device such that the engine sound is reinforced by the reinforcing sound due to output of the engine tone.

8. The system according to claim 1, wherein the reinforcing sound and the target tone are stored as data and reinforcing the engine sound is implemented based on the stored data.

9. The system according to claim 8, wherein the stored data is active sound design (ASD).

10. The system according to claim 1, wherein information of the sound source characteristics of the engine sound is an engine noise characteristic of at least one of engine vibration, combustion pressure, boost pressure, or exhaust pressure.

11. The system according to claim 2, wherein the vehicle driving information is an engine noise characteristic of at least one of vehicle speed, pedaling, engine speed, or a driving mode.

12. The system according to claim 1, wherein input variables of the artificial intelligence comprise at least one of plural vehicle sound characteristics, a target tone requested by the driver, and a driving pattern of the driver.

13. A method for controlling an engine tone by an artificial intelligence based on a sound quality index of a vehicle using the system of claim 1, comprising:
outputting a sound having an engine tone calculated by a signal processing controller based on at least one of vehicle driving information, engine noise characteristic information, or interior noise information,
wherein the signal processing controller performs optimizing an index of the sound based on the artificial intelligence.

14. The method according to claim 13, wherein the sound quality index is output as output variables of the artificial intelligence when an order array of engine speed and an order level of engine speed are changed.

15. The method according to claim 13, wherein a control value satisfying the sound quality index is output in the vehicle interior through a speaker.

16. The method according to claim 13, wherein the output engine sound of the vehicle interior is monitored to calculate a changed sound quality index, and feedback control is performed again.

17. The method according to claim 13, wherein the engine noise characteristic information is an engine noise characteristic of at least one of engine vibration, combustion pressure, boost pressure, or exhaust pressure.

18. The method according to claim 13, wherein the vehicle driving information is an engine noise characteristic of at least one of vehicle speed, pedaling, engine speed, or a driving mode.

19. The method according to claim 13, input variables of the artificial intelligence comprise at least one of plural vehicle sound characteristics, a target tone requested by the driver, and a driving pattern of the driver.

\* \* \* \* \*